(12) United States Patent
Peukert et al.

(10) Patent No.: US 12,230,157 B2
(45) Date of Patent: Feb. 18, 2025

(54) INFORMED DE-ICING PROCEDURES FOR AIRCRAFT FLIGHT PREPARATIONS

(71) Applicant: THE BOEING COMPANY, Chicago, IL (US)

(72) Inventors: Markus Florian Peukert, Darmstadt (DE); Samantha A. Schwartz, Castle Pines, CO (US); Mitchell G. Woolever, Arvada, CO (US); Jason W. Clark, Evergreen, CO (US); Katie M. Reid, Castle Rock, CO (US); Joshua T. Glazer, Rougemont, NC (US)

(73) Assignee: The Boeing Company, Chicago, IL (US)

( * ) Notice: Subject to any disclaimer, the term of this patent is extended or adjusted under 35 U.S.C. 154(b) by 1030 days.

(21) Appl. No.: 16/850,779

(22) Filed: Apr. 16, 2020

(65) Prior Publication Data
US 2021/0327290 A1    Oct. 21, 2021

(51) Int. Cl.
| G06G 7/70 | (2006.01) |
| B64D 15/20 | (2006.01) |
| G08G 5/06 | (2006.01) |

(52) U.S. Cl.
CPC ............ *G08G 5/06* (2013.01); *B64D 15/20* (2013.01)

(58) Field of Classification Search
CPC ...... G08G 5/06; G08G 5/0026; G08G 5/0013; G08G 5/0043; G08G 5/0065; G08G 5/0082; G08G 5/0091; G08G 5/065; B64D 15/20; B64F 5/20
See application file for complete search history.

(56) References Cited

U.S. PATENT DOCUMENTS

| 7,129,846 | B2 * | 10/2006 | Rasmussen | G01W 1/02 340/580 |
| 10,494,108 | B1 * | 12/2019 | Finley | B64D 43/00 |
| 2007/0040064 | A1 * | 2/2007 | Lee | B64F 5/20 244/134 R |
| 2012/0218127 | A1 * | 8/2012 | Kroen | G08G 5/0052 340/945 |
| 2012/0245836 | A1 * | 9/2012 | White | G08G 5/06 701/120 |
| 2016/0075436 | A1 * | 3/2016 | Rossano | G06F 3/04847 715/771 |
| 2019/0316909 | A1 * | 10/2019 | White | G06N 5/02 |
| 2022/0020281 | A1 * | 1/2022 | Stoppok | G08G 5/003 |

* cited by examiner

*Primary Examiner* — Adam M Alharbi
(74) *Attorney, Agent, or Firm* — Joseph M. Butscher; The Small Patent Law Group LLC

(57) ABSTRACT

The present disclosure provides for informed de-icing by identifying a travel time range for an aircraft from a de-icing station to a runway; identifying a holdover window based on predicted weather conditions during the travel time range; estimating a takeoff time for the aircraft based on a takeoff queue for the runway and the travel time range; and in response to the holdover window expiring before the estimated takeoff time, delaying the aircraft from de-icing. In some aspects, informed de-icing includes, in response to identifying an aircraft scheduled for de-icing within a caution threshold of a scheduled takeoff time and to determining that a push time cannot be delayed: evaluating an effect of repeating a de-icing operation for the aircraft on flight operations; and in response to the effect exceeding an impact threshold: rescheduling the de-icing operation for the aircraft based on a new takeoff time.

19 Claims, 5 Drawing Sheets

INFORMED DE-ICING PROCEDURES FOR AIRCRAFT FLIGHT PREPARATIONS

FIELD

Aspects of the present disclosure relate to aircraft control. More particularly, the present disclosure provides systems and methods for using real time and predictive analysis to manage flight preparations during evolving inclement weather conditions.

BACKGROUND

When preparing aircraft for flight operations in inclement weather, operators need to clear the aircraft of accumulations, such as, for example, snow or ice buildup on the aircraft, and to apply an anti-ice solution to prevent further accumulation. The two operations are collectively referred to herein as de-icing, although the operation of removing accumulation can also be individually referred to as de-icing when the operation of applying the anti-icing solution is referred to as anti-icing.

The anti-icing solution has a limited time window of viability, which is referred to herein as a holdover window. The holdover window is strictly measured from the time that the anti-icing solution is applied to when the aircraft reaches the runway for departure, and may vary based on several factors. If the aircraft is not able to reach the runway for departure within the holdover window, the anti-icing solution will need to be re-applied before the aircraft is allowed to take off, which can cause cascading delays as the crew and resources needed to re-prepare the aircraft for departure may also be needed to prepare other aircraft for departure.

SUMMARY

The present disclosure provides a method in one aspect, the method including: identifying a travel time range for an aircraft from a de-icing station to a runway; identifying a holdover window for the aircraft based on predicted weather conditions during the travel time range; estimating a takeoff time for the aircraft based on a takeoff queue for the runway and the travel time range; and in response to the holdover window expiring before the estimated takeoff time, delaying the aircraft from de-icing.

In one aspect, in combination with any example method above or below, wherein delaying the aircraft from de-icing comprises one or more of: rescheduling de-icing of the aircraft; delaying pushback of the aircraft; delaying pushback of the aircraft to reach the de-icing station and rescheduling de-icing of the aircraft; and delaying takeoff of the aircraft and rescheduling de-icing of the aircraft.

In one aspect, in combination with any example method above or below, the holdover window is further based on: an airframe type of the aircraft; an operator specification for the airframe type; and a time span to remove accumulation from and apply an anti-ice solution to the aircraft.

In one aspect, in combination with any example method above or below, the method further comprises, in response to the travel time range exceeding a fuel use threshold, increasing a fuel load of the aircraft.

In one aspect, in combination with any example method above or below, the de-icing station is co-located with a gate for the aircraft.

In one aspect, in combination with any example method above or below, the method further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time can be delayed without affecting the second takeoff time: delaying pushback for the second aircraft from a respective gate to thereby shift the second holdover window closer to the estimated second takeoff time.

In one aspect, in combination with any example method above or below, the method further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time cannot be delayed without affecting the second takeoff time: evaluating an effect of repeating a de-icing operation for the second aircraft on flight operations; and in response to the effect of repeating the de-icing operation exceeding an impact threshold, delaying the second takeoff time.

In one aspect, in combination with any example method above or below, the method further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time cannot be delayed without affecting the second takeoff time: evaluating an effect of repeating a de-icing operation for the second aircraft on flight operations; and in response to the effect of repeating the de-icing operation not exceeding an impact threshold, generating an alert to proceed to the de-icing operation as scheduled.

The present disclosure provides a method in one aspect, the method including: in response to identifying a first aircraft scheduled for de-icing within a first caution threshold of a first scheduled takeoff time and to determining that a first push time cannot be delayed without affecting the first scheduled takeoff time: evaluating a first effect of repeating a de-icing operation for the first aircraft on flight operations; and in response to the first effect of repeating the de-icing operation exceeding an impact threshold: delaying the first scheduled takeoff time; and rescheduling the de-icing operation for the first aircraft based on a new takeoff time.

In one aspect, in combination with any example method above or below, the method further comprises: in response to identifying a second aircraft scheduled for de-icing within a second caution threshold of a second scheduled takeoff time and to determining that a second push time can be delayed without affecting the second scheduled takeoff time: delaying the second push time to a new push time; and rescheduling a de-icing operation for the second aircraft based on the new push time.

In one aspect, in combination with any example method above or below, the method further comprises: in response to identifying a second aircraft scheduled for de-icing within a second caution threshold of a second scheduled takeoff time and to determining that a second push time cannot be delayed without affecting the second scheduled takeoff time: evaluating a second effect of repeating the de-icing operation for the second aircraft on flight operations; and in response to the second effect of repeating the de-icing operation not exceeding the impact threshold, generating an alert to proceed to the de-icing operation as scheduled for the second aircraft.

In one aspect, in combination with any example method above or below, evaluating the first effect of repeating the de-icing operation for the first aircraft on flight operations to exceed the impact threshold includes: determining that the first aircraft can complete the de-icing operation a second time before the scheduled takeoff time; determining that performing the de-icing operation the second time for the first aircraft will delay a second takeoff time for a second aircraft; and determining that the first aircraft lacks a higher priority for departure over the second aircraft.

In one aspect, in combination with any example method above or below, evaluating the first effect of repeating the de-icing operation for the first aircraft on flight operations to exceed the impact threshold includes: determining that the first aircraft cannot complete the de-icing operation a second time before the scheduled takeoff time.

In one aspect, in combination with any example method above or below, the impact threshold is based on: a fuel consumption and an anti-ice solution consumption for repeating the de-icing operation; and cascade effects of the first aircraft departing later based on the new takeoff time, including missed flights, crew operation schedules, and weather conditions at a destination.

The present disclosure provides a system in one aspect, the system including a processor; a memory storage device including instructions that when executed by the processor enable performance of an operation comprising: identifying a first travel time range for a first aircraft from a de-icing station to a runway; identifying a first holdover window for the first aircraft based on predicted weather conditions during the first travel time range; estimating a first takeoff time for the first aircraft based on a takeoff queue for the runway and the first travel time range; and in response to the first holdover window expiring after the estimated first takeoff time, generating an alert for the first aircraft to proceed to a de-icing operation as scheduled.

In one aspect, in combination with any example system above or below, the operation further comprises: in response to identifying a second aircraft competing with the first aircraft for use of the de-icing station, wherein the first aircraft is scheduled for de-icing within a first caution threshold of the first takeoff time, wherein the second aircraft is scheduled for de-icing within a second caution threshold of a second takeoff time for the second aircraft, and in response to determining that a second push time for the second aircraft cannot be delayed without affecting the second takeoff time: evaluating a first effect of repeating the de-icing operation for the first aircraft on flight operations; evaluating a second effect of repeating the de-icing operation for the second aircraft on the flight operations; and in response to the second effect of repeating the de-icing operation being greater than the first effect: delaying the second takeoff time; and rescheduling the de-icing operation for the second aircraft based on a new takeoff time.

In one aspect, in combination with any example system above or below, the first holdover window is further based on: an airframe type of the first aircraft; an operator specification for the airframe type; and a time span to remove accumulation from and apply an anti-ice solution to the first aircraft.

In one aspect, in combination with any example system above or below, the operation further comprises, in response to the first travel time range exceeding a fuel use threshold, increasing a fuel load of the first aircraft.

In one aspect, in combination with any example system above or below, the operation further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time for the second aircraft can be delayed without affecting the second takeoff time: delaying pushback for the second aircraft from a respective gate to thereby shift the second holdover window closer to the estimated second takeoff time.

In one aspect, in combination with any example system above or below, the de-icing station is co-located with a gate for the first aircraft.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides systems and methods for performing informed de-icing control based on real time weather data, short-term forecasts, flight planning data, and historical analysis of the preparation of aircraft during inclement weather for flight operations. Because aircraft undergo a de-icing process with a finite holdover window compete for resources at airports, the decision for when or whether to perform a de-icing operation can affect the ability of not only an individual aircraft to depart, but several other aircraft at the same airport.

For example, on an individual aircraft basis, a determination for whether to undergo de-icing or delay or forego de-icing can be based on whether the aircraft is expected to complete de-icing and reach the assigned runway within the holdover window. However, on a fleet or airport basis, a determination for whether to allow a given aircraft that is predicted to be able to complete de-icing and depart within the holdover window can be further influenced based on a confidence score in the prediction of the aircraft being able to de-ice and depart on time and the relative weights in a predictive model of other aircraft attempting to depart. For example, if an airport only has enough crew or de-icing stations to prepare n aircraft for departure in a given time window, but more than n aircraft need to depart during that time window, the n aircraft allowed to de-ice can be those with the highest likelihoods of successfully departing on time, those with the highest impact if departure is delayed (e.g., crew reaching end of shift, crew needed at a different airport, largest number of passengers, last flight to a given destination), those delayed the longest, etc.

A de-icing prediction system is therefore provided to balance the capabilities of individual aircraft to de-ice and depart within a respective holdover window with the operational capacities of an airport and fleets of aircraft competing for resources (e.g., a fixed number of runways and/or de-icing stations/crews). The de-icing prediction system analyzes the impacts of potential delays and missed holdover windows on resource usage and the follow-on effects of an individual aircraft being delayed or missing a holdover window on that individual aircraft (and the passengers and crew thereof) as well as the other aircraft and the ground crews servicing them. The de-icing system monitors the developing weather conditions and flight delays to adjust for and update predictions of whether a given aircraft can successfully undergo de-icing and depart in a holdover window (which has a duration affected by the weather conditions) or which aircraft should be prioritized for de-icing or be delayed to prioritize other aircraft for de-icing.

Figure 1:
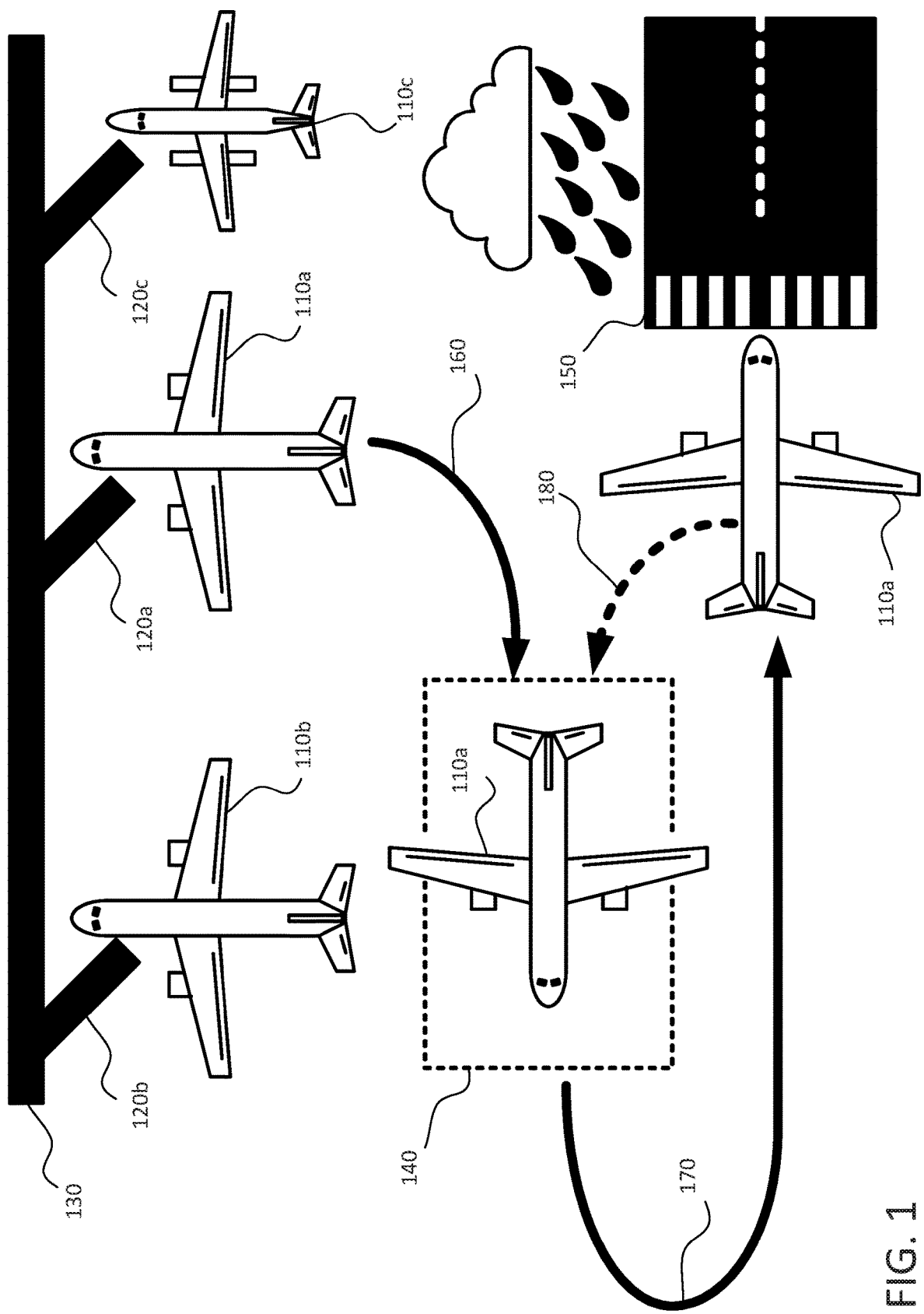
FIG. 1 illustrates a flight preparation management scenario during inclement weather, according to aspects of the present disclosure.

FIG. 1 illustrates a flight preparation management scenario during inclement weather, according to aspects of the present disclosure. In FIG. 1, several aircraft 110 (individually, a first aircraft 110a, a second aircraft 110b, a third aircraft 110c, etc.) are located at an the gates 120 (individually, a first gate 120a, a second gate 120b, a third gate 120c, etc.) of an airport experiencing inclement weather. A first aircraft 110a is shown undergoing a de-icing process in preparation for departure during inclement weather. The first aircraft 110a begins at a first gate 120a of a terminal 130, and undergoes de-icing (including the removal of accumulation and the application of an anti-ice solution) at a de-icing station 140. In various aspects, the de-icing station 140 can be co-located with the gate 120 (i.e., the aircraft 110 can be de-iced at the associated gate 120), can be a separate de-icing pad located away from the gates 120 and/or the terminal 130, or can be mobile (i.e., moving from location to location with the associated crew).

Although not illustrated in FIG. 1 as undergoing the de-icing process, the second aircraft 110b located at a second gate 120b of the terminal 130 and the third aircraft 110c located at a third gate 120c of the terminal 130 may compete with the first aircraft 110a for access to the de-icing station 140 (or the crew needed to operate individual de-icing stations 140). Once de-icing is complete, the first aircraft 110a taxis to the runway 150 for departure. To ensure that the first aircraft 110a is prepared for departure, the time between applying the anti-icing solution and reaching the runway 150 needs to fall within the holdover window set for the first aircraft 110a, otherwise the first aircraft 110a will needs to undergo de-icing again before being able to depart.

FIG. 1 illustrates the pathway of the first aircraft 110a through the de-icing and departure processes. A first leg 160 from the associated first gate 120a to the de-icing station 140 is illustrated for the first aircraft 110a, but may be omitted in some aspects (e.g., when the gate 120 and the de-icing station 140 are co-located). Depending on the amount of time needed to travel the first leg 160 (or the ability of de-icing crew to move from one location to another), the aircraft 110 can request or schedule various pushback times (also referred to as push times) to leave the gate 120 and perform de-icing processes.

A second leg 170 from the de-icing station 140 to the runway 150 is illustrated, and is the portion of the pathway that is measured against the holdover window. The holdover window is measured from when the anti-icing solution is first applied to when the aircraft 110 reaches the runway 150. The ability for the aircraft 110 to traverse the second leg 170 within the holdover window can be influenced by many factors. For example, the distance from the de-icing station 140 to the runway 150, how weather conditions affect taxiing speed over the second leg 170, whether the aircraft 110 needs to wait for other aircraft queued for departure to use the runway 150, the given airframe type of the aircraft 110 (e.g., a model X aircraft 110 takes x minutes to complete de-icing whereas a model Y aircraft 110 takes y minutes to complete de-icing), fleet management rules for holdover windows (e.g., fleet manager X (e.g., a given airline) is approved for a holdover window of x minutes during weather condition z, whereas fleet manager Y is approved for a holdover window of y minutes), etc., may all affect the ability for the aircraft 110 to traverse the second leg 170 within the holdover window. When the aircraft 110 reaches the runway 150 within the holdover window, the aircraft 110 can take off and depart. Otherwise, when the aircraft 110 does not reach the runway 150 within the holdover window, the aircraft 110 optionally traverses the third leg 180, back from the runway 150 to the de-icing station 140, which may be the same de-icing station 140 or a different de-icing station 140 from that used previously.

One strategy to increase the chances of a given aircraft (e.g., 110a-c) traversing the second leg 170 within the holdover window is to delay application of the anti-icing solution for as long as possible, thus allowing other queued aircraft to depart so that the given aircraft (e.g., 110a) does not need to wait as long for takeoff. The aircraft 110 can delay application of the anti-icing solution by delaying pushback from the gate 120. Additional strategies to increase the chances of a given aircraft 110 traversing the second leg 170 within the holdover window include selecting a de-icing station 140 closer to the runway 150, selecting a runway 150 closer to the de-icing station 140, de-icing at the runway 150, etc. If these strategies are not predicted to be successful (or likely to be successful), the aircraft 110 can reschedule a departure time by either attempting to move up a departure time to "get ahead of" the weather or delaying a departure time to wait for more favorable weather conditions.

Figure 2:
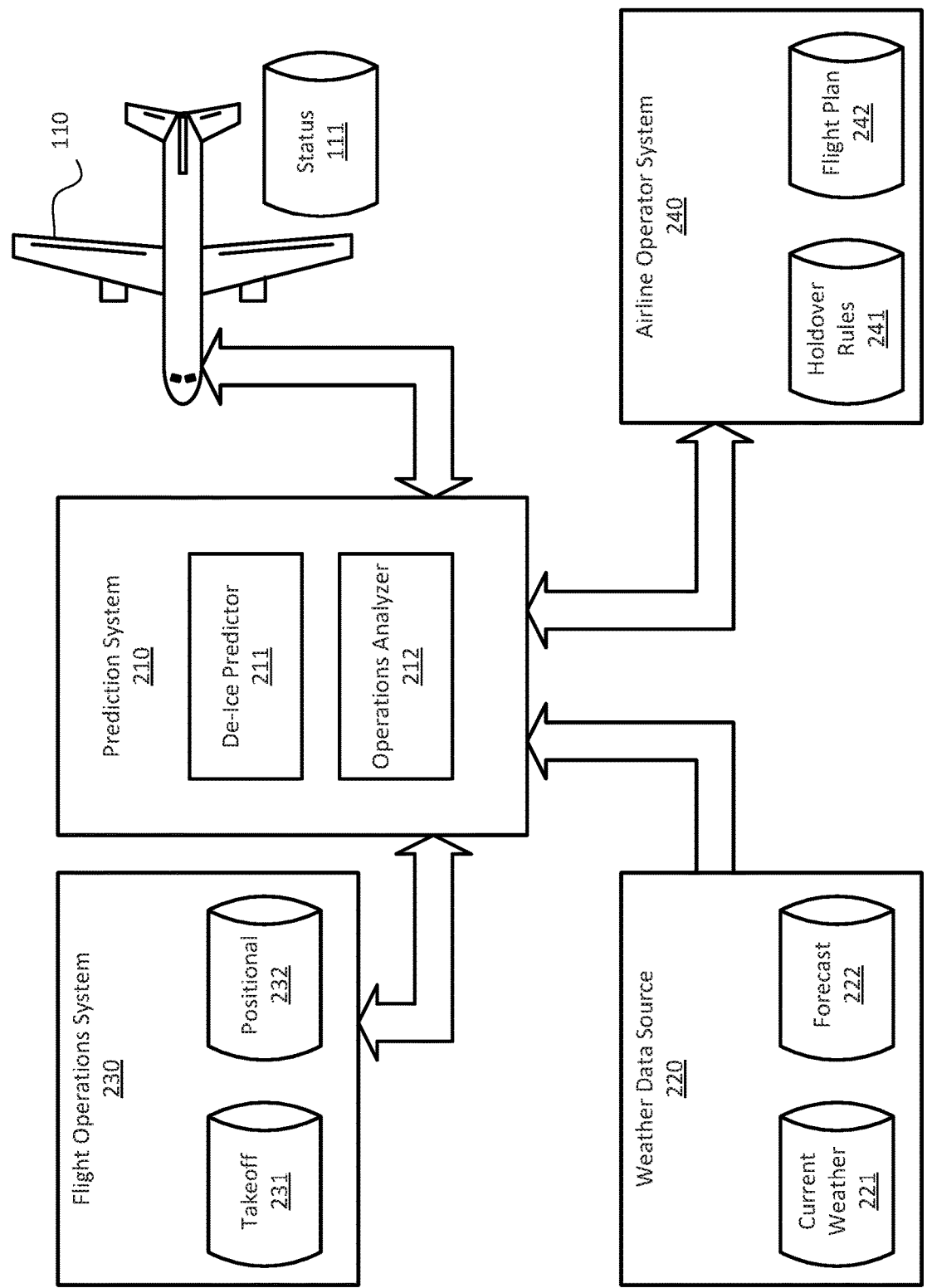
FIG. 2 illustrates a data processing architecture, according to aspects of the present disclosure.

FIG. 2 illustrates a data processing architecture 200, according to aspects of the present disclosure. To predict and manage which aircraft 110 can successfully traverse the respective second legs within the respective holdover windows, a prediction system 210 manages the several strategies available to the aircraft 110 to provide various alerts for how the aircraft 110 are to proceed.

The prediction system 210 is in communication with the various aircraft 110, a weather data source 220, a flight operations system 230, and an airline operator system 240 in this example. Each of the aircraft 110, prediction system 210, weather data source 220, flight operations system 230, and airline operator system 240 are representative of or include one or more computing devices, such as those described in relation to FIG. 5, that process and store various data, and operations of the prediction system 210 may be performed on dedicated hardware or as part of a cloud computing environment in various aspects. Although the aircraft 110, weather data source 220, flight operations system 230, and airline operator system 240 are illustrated as single systems, in various aspects, the prediction system 210 is in communications with several instances of each, and each instance may provide some or all of the associated data in different aspects.

The aircraft 110 provides the prediction system 210 with various status data 111 for the aircraft 110. The status data 111 can indicate a fuel level of the aircraft 110, whether the aircraft 110 is ready for pushback (or when the aircraft 110 is expected to be ready for pushback), crew operation times for the aircraft 110, whether the aircraft 110 and/or crew are located at a "home" airport, etc.

The weather data source 220 provides the prediction system 210 with current weather data 221 and forecast data 222. The weather data 221 include current weather conditions at the airport, such as: temperature, wind speed and direction, precipitation type (e.g., rain, freezing rain, snow, sleet, hail, graupel, etc.), precipitation amount, cloud cover, visibility, barometric pressure, and the like. The forecast data 222 include predictions for weather events for the airport in the near future. The forecast data 222 also includes weather information from other locations (e.g., weather data 221 for other airports or meteorological stations) which can be combined with known weather patterns and prevailing winds in forecasting at an origin airport and/or to determine whether a delay at an origin will have cascading effects at a destination. For example, if a destination is experiencing inclement weather for the next H hours, a given aircraft (including passengers and crew) may experience less overall disruption if the given aircraft is delayed until the destination's weather clears. The data provided by the weather data source 220 can include terminal aerodrome forecasts (TAF), aerodrome routine meteorological reports (also referred to as METAR), graphic area forecasts (GAF), and International Civil Aviation Organization (ICAO) Meteorological Information Exchange Model (IWXXM) data, among other weather reporting formats.

Determining whether an aircraft 110 can complete the de-icing and taxiing process to reach the assigned runway within the holdover window can be particularly challenging when weather conditions are changing. The changing weather conditions can affect the holdover window (e.g., an anti-icing solution is rated for X minutes during light snow, but Y minutes during freezing rain), and can also affect how long the aircraft can take to taxi from a de-icing station to the runway. Accordingly, the prediction system 210 uses the weather data 221 and the forecast data 222 to account for and prepare aircraft 110 for operations based on current and forecasted weather conditions.

The flight operations system 230, which can include local air traffic controller systems, remote air traffic controller systems as well as regional, national, or global navigation and tracking systems provides takeoff data 231 and positional data 232 for the airport. In various aspects, the takeoff data 231 includes scheduled times and aircraft queued for takeoff, which can establish a takeoff rate for individual runways 150 and/or the airport as a whole. The positional data 232 can include (ground-related) ADS-B (Automatic Dependent Surveillance-Broadcast) data for where various aircraft 110 are located, reported gate assignments for aircraft 110, reported de-icing crew locations, AMDB (Airport Mapping Database) data for the arrangement of various features (e.g., gates, de-icing stations, runways, taxiways) at the airport, and the like.

The airline operator system 240 provides the prediction system 210 with holdover rules data 241 and flight plan data 242. The holdover rules data 241 specify the holdover windows for various types of aircraft 110 during various weather conditions, and may vary from airline to airline. For example, airline A operating a first aircraft can specify a holdover window of X minutes during a given weather condition whereas airline B operating a second aircraft of the same type as the first aircraft can specify a holdover window of Y minutes during the given weather condition (e.g., where X≠Y). In a further example, a first aircraft and a third aircraft of different types that are operated by the same airline can have different holdover windows based on the size and geometries of the respective aircraft 110.

The flight plan data 242 specify information about the aircraft 110 at the airport and inbound to the airport including a number of passengers, a crew manifest (including duty times and "home" airports), departure and estimated time of arrival (ETA) times for a currently scheduled flight, information related to a next scheduled flight, etc.

The prediction system 210 receives the data from the other systems to perform informed de-icing decision making, and to communicate those decisions back to the various systems for further processing and analysis. For example, if a decision is made that an aircraft 110 cannot successfully de-ice and taxi within the holdover window, the prediction system 210 can indicate that the aircraft 110 should delay takeoff (reschedule to a later time), which is communicated to aircraft 110 (informing the pilot to not push back), the flight operation system 230 (informing traffic controllers and de-icing crews that the aircraft 110 does not need taxi or de-ice services at the original scheduled times), and the airline operator system 240 to shift flight itineraries to account for a later arrival time of the aircraft 110 at the destination.

The prediction system 210 includes a de-ice predictor 211, which analyzes whether individual aircraft 110 can successfully complete de-icing and taxiing operations within a predicted holdover window based on developing and predicted weather conditions, and an operations analyzer 212, which analyzes the collective effects of the aircraft 110 competing for de-icing resources at a given airport to optimize flight operations (e.g., delaying or cancelling the fewest number of flights, inconveniencing the smallest number of passengers, ensuring the largest amount of hardware and crews end a day at home locations).

The de-ice predictor 211 and the operations analyzer 212 provide various time ranges and confidence scores for whether individual aircraft 110 can depart as scheduled, which allows for various flights to be prioritized for access to limited de-icing resources to thereby minimize or reduce the impact to flight operations as a whole for an airport.

In various aspects, the de-ice predictor 211 and the operations analyzer 212 include artificial intelligence models developed from previous inclement weather events to better predict what the effect of a weather event will have on the individual aircraft 110 and what the eventual impact of delaying a given aircraft 110 will have on flight operations for the airport, for travelers, for the airlines, and for other airports.

For example, the de-ice predictor 211 can indicate that a first aircraft and a second aircraft are both capable of undergoing de-ice operations and departing within respective holdover windows, but limited resources indicate that only one of the two aircraft 110 can be scheduled for de-icing within the scheduled departure times (i.e., the first aircraft can depart on time, but will delay the second aircraft or the second aircraft can depart on time, but will delay the first aircraft). The operations analyzer 212 can select (or recommend to a human operator) one of the first aircraft 110a and the second aircraft to receive de-icing resources, and the other to be delayed. In various aspects, the different criteria used to determine which aircraft 110 to recommend for de-icing can be based on one or more of: a likelihood of the aircraft 110 completing de-icing and taxiing before the holdover window expires, a number of passengers currently on the aircraft 110 that would be inconvenienced by a delay, a number of passengers scheduled for future flights on the aircraft 110 during the same day that would be inconvenienced by cascading delays, whether the aircraft 110 is located at a "home" location to begin operations on the next day (e.g., affecting scheduling and cascading delays for ground and flight crews as well as potential passengers), a number of crew on the aircraft 110 that would be inconvenienced by the delay and/or cascading delays, whether replacement crew will need to be scheduled for the aircraft 110 if delayed, etc.

Figure 3:
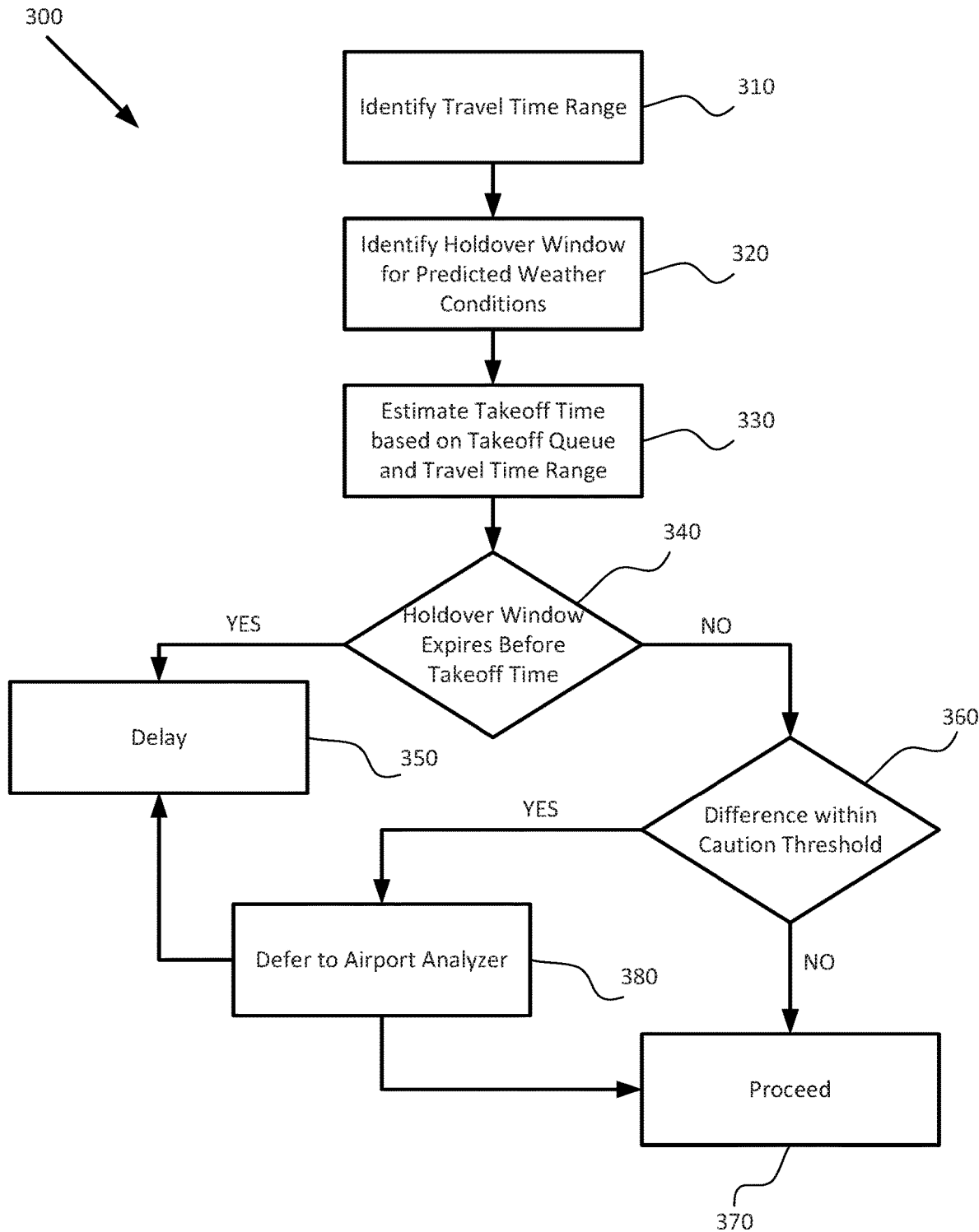
FIG. 3 is a flowchart of a method for informing the de-icing of an aircraft, according to aspects of the present disclosure.

FIG. 3 is a flowchart of a method 300 for controlling the de-icing of an aircraft, according to aspects of the present disclosure. Method 300 begins with block 310, where the de-ice predictor determines a travel time range for an aircraft from a de-icing station (e.g., a dedicated de-icing pad, an at-gate location, or a designated location with a de-icing crew) to a runway assigned to that aircraft. The travel time range includes an upper bound and a lower bound based on a confidence in the travel time, as affected by current and forecasted weather conditions. The travel times can be based on AMDB data indicating distances from various gates to various locations at a given airport (e.g., de-icing stations, runways, etc.), known taxiing speeds during specific weather conditions, congestion patterns at the airport, etc.

In various aspects, the de-ice predictor identifies a fuel usage rate across the travel time range and signals an operator to increase a fuel load of the aircraft to account for additional time spent in taxiing to, taxiing from, and remaining powered during de-icing operations. For example, when the predicted fuel usage across the travel time range exceeds a fuel use threshold, the de-ice predictor can signal the aircraft to increase a fuel load or for a ground crew team to refuel the aircraft before the aircraft taxis to the runway. In some aspects, if the aircraft is predicted to require refueling (or additional fuel), the fuel is added before the aircraft begins the de-icing procedure, or the additional time to fill the fuel tanks is accounted for when predicting whether the aircraft can complete de-icing, taxiing, and fueling operations within the holdover window.

At block 320, the de-ice predictor identifies a holdover window for the aircraft based on the current and forecasted weather conditions and the holdover rules specified by the airline for the given airframe type of the aircraft for the current and forecasted weather conditions. The holdover window also is based on a time span to remove accumulation from and apply an anti-ice solution to the aircraft, which may be based on the type of accumulation on the aircraft (e.g., snow versus ice), how long the accumulation has had to collect, and whether the accumulation is ongoing.

At block 330, the de-ice predictor estimates a takeoff time for the aircraft based on the takeoff queue for the runway assigned to the aircraft and the travel time range. For example, if the travel time for a given aircraft is between five to seven minutes, and the takeoff queue indicates that four other aircraft are queued ahead of the given aircraft with an average takeoff rate of one per minute, the takeoff time can be estimated to be between five and seven minutes (as the queued other aircraft will have cleared the runway by the time the given aircraft reaches the runway). In another example, if the travel time range for the aircraft is between five to seven minutes, and the takeoff queue indicates than ten other aircraft are queued for takeoff at an average takeoff rate of one per minute, the takeoff time can be estimated to be at least ten minutes (to account for the other aircraft queued ahead of the given aircraft).

At block 340, the de-ice predictor determines whether the holdover window expires before the takeoff time is estimated to occur. In response to the holdover window expiring before the estimated takeoff time, method 300 proceeds to block 350, where the de-ice predictors signals to delay the aircraft from de-icing. In response to the holdover window expiring after the estimated takeoff time (or not expiring before the estimated takeoff time), method 300 proceeds to block 360 for further analysis.

At block 350, the de-ice predictor signals to delay the aircraft from de-icing. In various aspects, the de-ice predictor signals the aircraft being delayed from de-icing, the flight operations system for the airport, and the airline operator system for the operator of the aircraft that the aircraft is being delayed. In various aspects, the action taken for delaying the aircraft includes: rescheduling de-icing of the aircraft (e.g., when and where the aircraft is to be de-iced), delaying pushback of the aircraft from an associated gate, delaying pushback of the aircraft to reach the de-icing station and rescheduling de-icing of the aircraft, and delaying takeoff of the aircraft and rescheduling de-icing of the aircraft. Depending on the type of delay, the alert signaling the delay can be accompanied with a scheduling update including a new departure time, runway assignment, and/or de-icing station assignment and reservation time.

At block 360, the de-ice predictor further analyzes whether the aircraft can complete de-icing and taxiing within the holdover window based on a caution threshold. For example, when the de-ice predictor determines that the holdover window expires after the takeoff time, but the difference between the expiration of the holdover window and the takeoff time is less than a caution threshold, the aircraft might be ready for takeoff before the holdover window expires, but if weather conditions worsen or de-icing or taxiing take longer than predicted, the aircraft will not be ready for takeoff before the holdover window expires.

When the difference between the holdover window expiring and the takeoff time occurring is outside of a caution threshold, indicating a high confidence in the aircraft completing de-icing and taxiing within the holdover window, method 300 proceeds to block 370, where the de-ice predictor signals that the aircraft is to proceed with de-icing and departure as currently scheduled. For example, if the caution threshold indicates that any aircraft with a holdover window expiring within two minutes of the takeoff time has a lowered expectation or confidence is taking off on-schedule, but a given aircraft has a holdover window expiring more than three minutes after the takeoff time, the de-ice predictor can indicate with a high level of confidence that the given aircraft should proceed to de-ice and depart as currently scheduled.

Figure 4:
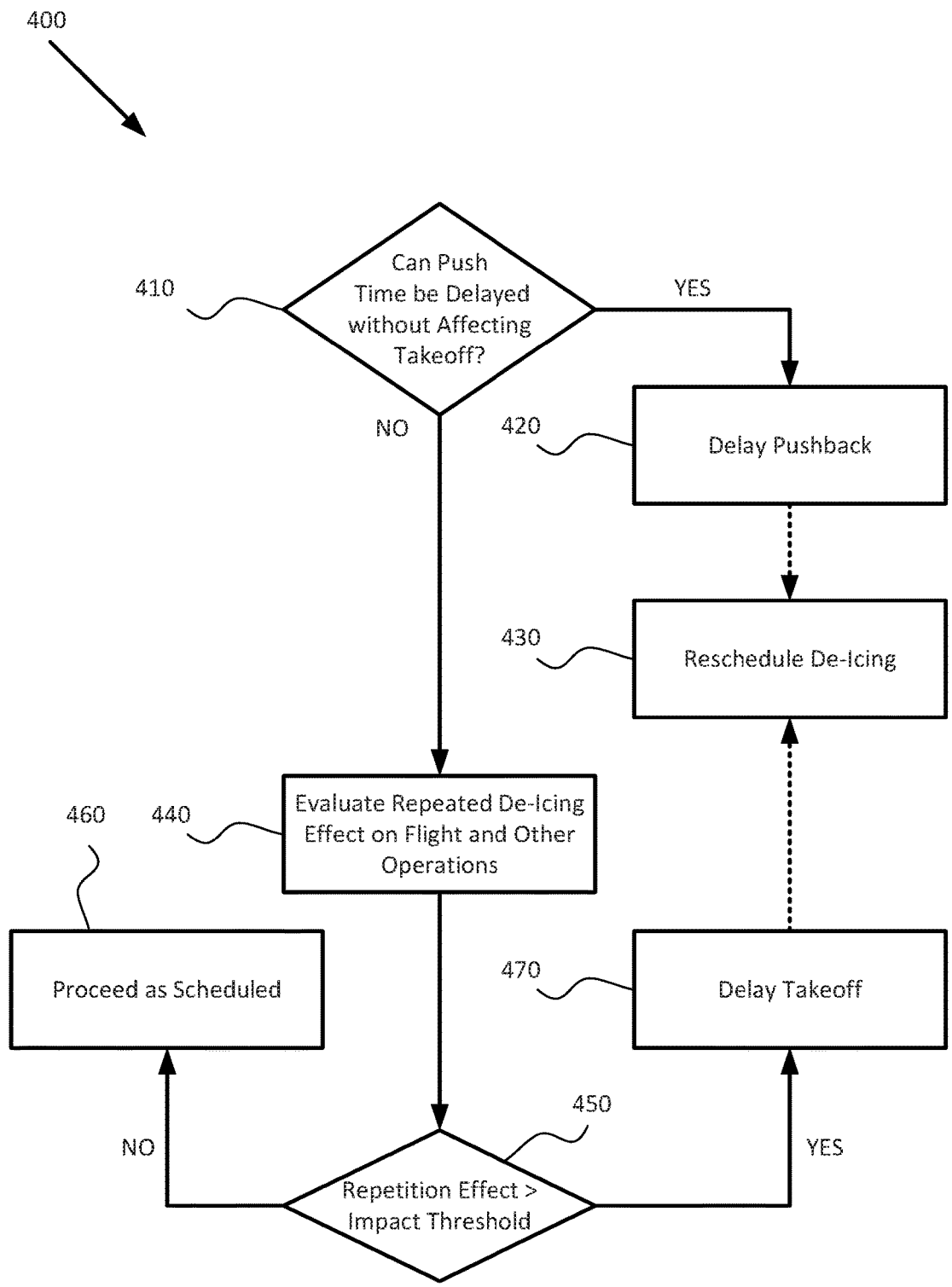
FIG. 4 is a flowchart of a method for informing the de-icing of an aircraft, according to aspects of the present disclosure.

When the difference between the holdover window expiring and the takeoff time occurring is within a caution threshold, method 300 proceeds to block 380, where the de-ice predictor defers to the operations analyzer to determine whether to delay the aircraft or signal the aircraft to proceed to de-icing, as is discussed in greater detail in regard to FIG. 4. The operations analyzer can delay aircraft according to various strategies to increase the likelihood of the aircraft being ready for takeoff during the holdover window (e.g., delaying pushback and/or de-icing procedures while keeping the same departure time) or base a determination to allow an aircraft to proceed as originally scheduled based on a more holistic knowledge of operations of other aircraft and support systems at the airport.

FIG. 4 is a flowchart of a method 400 for informing the de-icing of an aircraft, according to aspects of the present disclosure. Method 400 begins with block 410, in response to identifying an aircraft scheduled for de-icing within a caution threshold of a first scheduled takeoff time, where the operations analyzer (e.g., 212 in FIG. 2) determines whether the push time for that aircraft can be delayed without affecting a corresponding takeoff time.

At block 420, in response to determining that the push time can be delayed without affecting the aircraft departing at the takeoff time, the operations analyzer delays the pushback of the aircraft from an associated gate (e.g., 120a in FIG. 1).

In various aspects, several aircraft 110 can compete for a fixed set of de-icing resources (e.g., pad space, crew attention, etc.), and access to the resources may be provided on a first-come-first-served basis. The operations analyzer can thereby soft-schedule several aircraft for use of one set of de-icing resources by scheduling when those aircraft push back from the respective gates, thus staggering when the aircraft reach a shared de-icing station. The operations analyzer can schedule under the first-come-first-served schema based on the expected travel times from gates to the de-icing pads (e.g., the first leg 160 in FIG. 1) and the expected de-icing times of the aircraft scheduled for deicing at the de-icing pad.

At block 430, the operations analyzer reschedules the de-icing procedure for the affected aircraft. In a pre-scheduled or crew scheduled schema, the operations analyzer can schedule several aircraft for use of one set of resources by transmitting assignment windows to the aircraft and/or de-icing crews. For example, referring back to FIG. 1, if a first aircraft and a second aircraft are located at a de-icing station, the de-icing crew knows which aircraft to de-ice (and when) based on the transmitted schedule.

At block 440, in response to determining that the push time cannot be delayed without affecting the aircraft departing at the takeoff time, the operations analyzer evaluates the effect of repeated de-icings for one aircraft on the scheduled flight for that aircraft, on future flights for that aircraft (e.g., from the current destination airport to subsequent destinations airports), as well as on the current and future flights for other aircraft departing from the current airport.

At block 450, the operations analyzer determines whether the repetition effect is greater than an impact threshold of operations. The impact threshold is based on the amount of fuel and anti-ice solution consumed by the aircraft if repetition of the de-icing operation is required, as well as the de-icing crew availability versus consumed time for repeating the de-icing of the aircraft. The impact threshold is also based on the cascade effects of the aircraft departing at a later new takeoff time if departure is delayed, which includes the effects of missing the original depart time on the connecting flights for the passengers, crew operation schedules, and the weather conditions developing at a destination (e.g., would the flight need to be diverted if delayed).

In a further example, the impact threshold can also be based on whether a second (or subsequent) de-icing attempt would cause a second aircraft to be delayed from a scheduled takeoff or otherwise reduce a confidence in the second aircraft being able to complete de-icing and taxiing within a holdover window, particularly as weather conditions continue to develop as the second aircraft waits for the first aircraft to repeat de-icing procedures.

In one example, the operations analyzer determines that the repetition effect is greater than the impact threshold when a first aircraft cannot complete the de-icing operation a second (or subsequent) time before the scheduled takeoff time. Accordingly, the de-ice predictor has indicated a low confidence in the first aircraft completing the de-icing and taxiing operations before scheduled takeoff, and the operations analyzer has determined that the current schedule does not permit for the first aircraft to re-attempt to de-ice, and if resources are constrained at the airport, that the first aircraft should defer to a second aircraft (with a higher confidence in making a scheduled departure) using the de-icing station.

In a further example, the operations analyzer determines that the repetition effect is greater than the impact threshold when a first aircraft can complete the de-icing operation a second (or subsequent) time before the scheduled takeoff time, but a second aircraft has a higher departure priority than the first aircraft. The departure priority can be identified by the operations analyzer based on which aircraft, if delayed from departing on time would have a greater negative effect on future flight operations, would be more difficult to de-ice for a second time (e.g., the aircraft requiring a greater amount of anti-icing solution, the aircraft with the shorter holdover window for developing weather conditions, the aircraft with further to travel to/from the de-icing station that will consume more fuel or will require refueling), or has a higher relative confidence level in completing de-ice and taxiing within the holdover window. Accordingly, when the de-ice predictor indicates low confidences in a first aircraft and a second aircraft completing the de-icing and taxiing operations before respective scheduled takeoffs and that the operations analyzer identifies that the two aircraft are competing for the use of the same de-icing station, the operations analyzer identifies which aircraft should be granted access to the de-icing station and which is signaled to defer access.

For example, when the operations analyzer identifies that if the second aircraft were delayed from departing as scheduled that the effects of later flights would be more severe than if the first aircraft were delayed, that the first aircraft should defer to the second aircraft—indicating that the second aircraft should proceed as scheduled (per block 460) and that the first aircraft should delay takeoff (per block 470).

At block 460, the operations analyzer signals that the aircraft is to proceed with de-icing and departure as currently scheduled. In various aspects, the operations analyzer sends an alert to the aircraft, the flight operations system for the airport, and the airline operator system for the operator of the aircraft that the aircraft is proceeding as scheduled for de-icing and departure.

At block 470, the operations analyzer that the aircraft is to delay takeoff. In various aspects, the operations analyzer signals the aircraft being delayed from takeoff, the flight operations system for the airport, and the airline operator system for the operator of the aircraft that the aircraft is being delayed. In various aspects, the alert signaling the delay can be accompanied with a scheduling update including a new departure time, runway assignment, and/or de-icing station assignment/reservation time. Method 400 may then proceed to block 430 to re-schedule de-icing based on the new takeoff time, or may conclude if the delayed takeoff results in the flight being cancelled or shifted in time when the weather is expected to clear enough that de-icing is no longer necessary.

Figure 5:
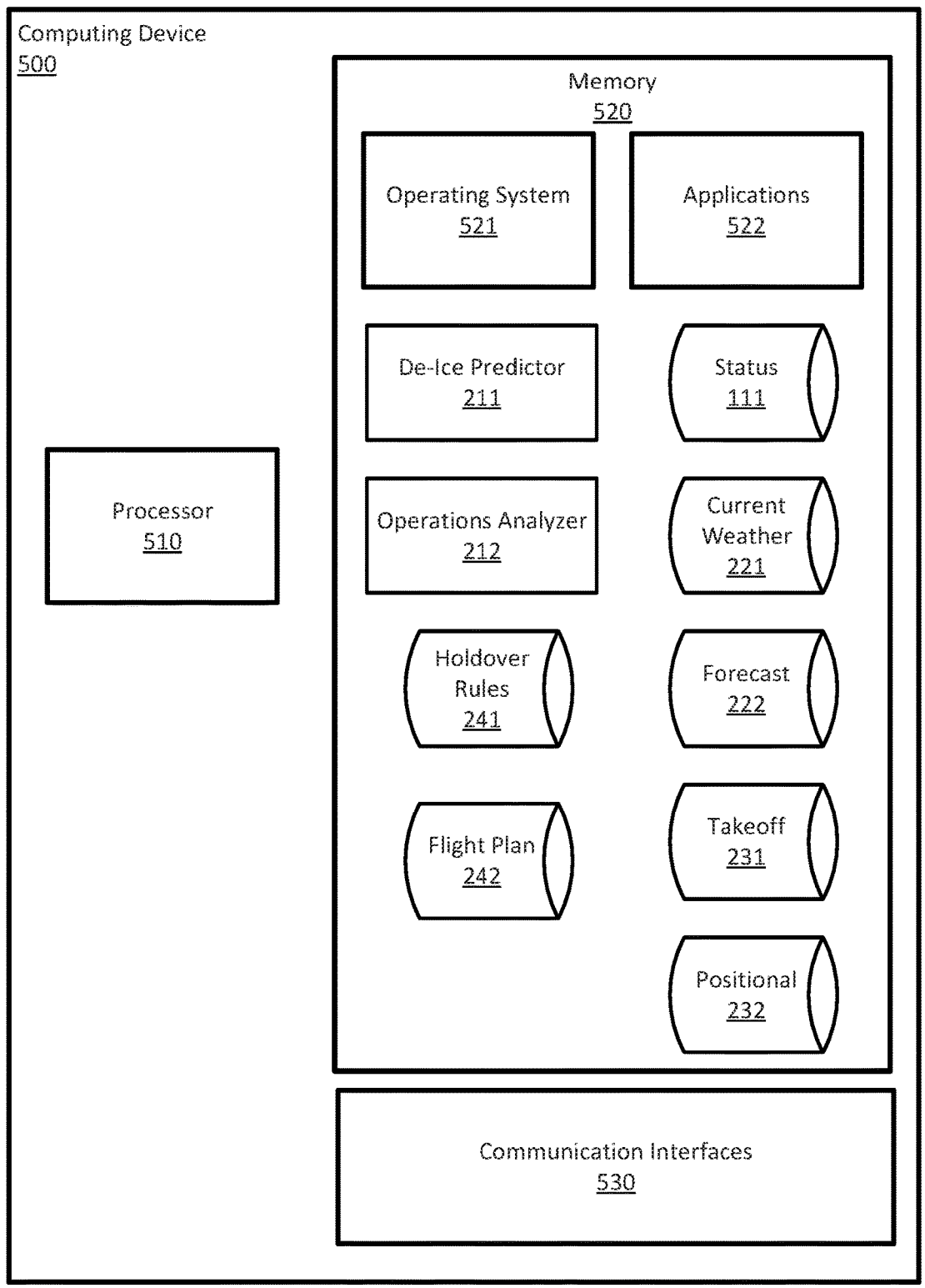
FIG. 5 illustrates a computing device, according to aspects of the present disclosure.

FIG. 5 illustrates a computing device, according to aspects of the present disclosure. FIG. 5 illustrates example computing components of a computing device 500 or other processing system as may be used to provide informed de-icing as described in the present disclosure by one or more of the prediction system 210, weather data source 220, flight operations system 230, airline operator system 240, and/or an onboard computer for an aircraft 110.

The computing device 500 includes a processor 510, a memory 520, and an interface 530. The processor 510 and the memory 520 provide computing functionality to run various programs and/or operations for the respective computing device 500, including the storage and retrieval of the various data described herein.

The processor 510, which may be any computer processor capable of performing the functions described herein, executes commands based on inputs received from a user and the data received from the interface 530.

The interface 530 connects the computing device 500 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 530 is used to send and receive between computing devices 500 and to communicate alerts (including go, no-go, and caution alerts) to aircraft 110 and the operators thereof.

The memory 520 is a memory storage device that generally includes various processor-executable instructions, that when executed by the processor 510, perform the various functions related to informed de-icing discussed herein. The processor-executable instructions may generally be described or organized into various "applications" or "modules" in the memory 520, although alternate implementations may have different functions and/or combinations of functions. The memory 520 also generally includes data structures that store information for use by or output by the various applications or modules. In the present disclosure, the memory 520 includes at least instructions for an operating system 540 and one or more application(s) 550. The memory 520 may be one or more memory devices, such as, for example, Random Access Memory (RAM), Read Only Memory (ROM), flash memory, or any other type of volatile or non-volatile storage medium that includes instructions that the processor 510 may execute.

When the computing device 500 provides the functionality of the prediction system 210 (per FIG. 2), the memory 520 includes processor executable instructions to provide the functionalities thereof described in the present disclosure. In some aspects, the memory 520 includes databases for locally caching data for analysis by the de-ice predictor 211 and/or the operations analyzer 212, but can also use data maintain on and received via the interface 530 from a weather data source, a flight operations system, an airline operator system, and/or an aircraft including the status data 111, current weather data 221, forecast data 222, takeoff data 231, positional data 232, holdover rules data 241, flight plan data 242, etc.

A further understanding of at least some of the aspects of the present disclosure is provided with reference to the following numbered Clauses, in which:

Clause 1: A method, comprising: identifying a travel time range for an aircraft from a de-icing station to a runway; identifying a holdover window for the aircraft based on predicted weather conditions during the travel time range; estimating a takeoff time for the aircraft based on a takeoff queue for the runway and the travel time range; and in response to the holdover window expiring before the estimated takeoff time, delaying the aircraft from de-icing.

Clause 2: A method as is described in any of Clauses 1 and 3-8, wherein delaying the aircraft from de-icing comprises one or more of: rescheduling de-icing of the aircraft; delaying pushback of the aircraft; delaying pushback of the aircraft to reach the de-icing station and rescheduling de-icing of the aircraft; and delaying takeoff of the aircraft and rescheduling de-icing of the aircraft.

Clause 3: A method as is described in any of Clauses 1-2 and 4-8, wherein the holdover window is further based on: an airframe type of the aircraft; an operator specification for the airframe type; and a time span to remove accumulation from and apply an anti-ice solution to the aircraft.

Clause 4: A method as is described in any of Clauses 1-3 and 5-8, that further comprises, in response to the travel time range exceeding a fuel use threshold, increasing a fuel load of the aircraft.

Clause 5: A method as is described in any of Clauses 1-4 and 6-8, wherein the de-icing station is co-located with a gate for the aircraft.

Clause 6: A method as is described in any of Clauses 1-5 and 7-8 that further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time can be delayed without affecting the second takeoff time: delaying pushback for the second aircraft from a respective gate to thereby shift the second holdover window closer to the estimated second takeoff time.

Clause 7: A method as is described in any of Clauses 1-6 and 8 that further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time cannot be delayed without affecting the second takeoff time: evaluating an effect of repeating a de-icing operation for the second aircraft on flight operations; and in response to the effect of repeating the de-icing operation exceeding an impact threshold, delaying the second takeoff time.

Clause 8: A method as is described in any of Clauses 1-7 that further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time cannot be delayed without affecting the second takeoff time: evaluating an effect of repeating a de-icing operation for the second aircraft on flight operations; and in response to the effect of repeating the de-icing operation not exceeding an impact threshold, generating an alert to proceed to the de-icing operation as scheduled.

Clause 9: A method, comprising: in response to identifying a first aircraft scheduled for de-icing within a first caution threshold of a first scheduled takeoff time and to determining that a first push time cannot be delayed without affecting the first scheduled takeoff time: evaluating a first effect of repeating a de-icing operation for the first aircraft on flight operations; and in response to the first effect of repeating the de-icing operation exceeding an impact threshold: delaying the first scheduled takeoff time; and rescheduling the de-icing operation for the first aircraft based on a new takeoff time.

Clause 10: A method as is described in any of Clauses 9 and 11-14 that further comprises: in response to identifying a second aircraft scheduled for de-icing within a second caution threshold of a second scheduled takeoff time and to determining that a second push time can be delayed without affecting the second scheduled takeoff time: delaying the second push time to a new push time; and rescheduling a de-icing operation for the second aircraft based on the new push time.

Clause 11: A method as is described in any of Clauses 9-10 and 12-14 that further comprises: in response to identifying a second aircraft scheduled for de-icing within a second caution threshold of a second scheduled takeoff time and to determining that a second push time cannot be delayed without affecting the second scheduled takeoff time: evaluating a second effect of repeating the de-icing operation for the second aircraft on flight operations; and in response to the second effect of repeating the de-icing operation not exceeding the impact threshold, generating an alert to proceed to the de-icing operation as scheduled for the second aircraft.

Clause 12: A method as is described in any of Clauses 9-11 and 13-14, wherein evaluating the first effect of repeating the de-icing operation for the first aircraft on flight operations to exceed the impact threshold includes: determining that the first aircraft can complete the de-icing operation a second time before the scheduled takeoff time; determining that performing the de-icing operation the second time for the first aircraft will delay a second takeoff time for a second aircraft; and determining that the first aircraft lacks a higher priority for departure over the second aircraft.

Clause 13: A method as is described in any of Clauses 9-12 and 14, wherein evaluating the first effect of repeating the de-icing operation for the first aircraft on flight operations to exceed the impact threshold includes: determining that the first aircraft cannot complete the de-icing operation a second time before the scheduled takeoff time.

Clause 14: A method as is described in any of Clauses 9-13, wherein the impact threshold is based on: a fuel consumption and an anti-ice solution consumption for repeating the de-icing operation; and cascade effects of the first aircraft departing later based on the new takeoff time, including missed flights, crew operation schedules, and weather conditions at a destination.

Clause 15: A system, comprising: a processor; a memory storage device including instructions that when executed by the processor enable performance of an operation comprising: identifying a first travel time range for a first aircraft from a de-icing station to a runway; identifying a first holdover window for the first aircraft based on predicted weather conditions during the first travel time range; estimating a first takeoff time for the first aircraft based on a takeoff queue for the runway and the first travel time range; and in response to the first holdover window expiring after the estimated first takeoff time, generating an alert for the first aircraft to proceed to a de-icing operation as scheduled.

Clause 16: A system as is described in any of Clauses 15 and 17-20, wherein the operation further comprises: in response to identifying a second aircraft competing with the first aircraft for use of the de-icing station, wherein the first aircraft is scheduled for de-icing within a first caution threshold of the first takeoff time, wherein the second aircraft is scheduled for de-icing within a second caution threshold of a second takeoff time for the second aircraft, and in response to determining that a second push time for the second aircraft cannot be delayed without affecting the second takeoff time: evaluating a first effect of repeating the de-icing operation for the first aircraft on flight operations; evaluating a second effect of repeating the de-icing operation for the second aircraft on the flight operations; and in response to the second effect of repeating the de-icing operation being greater than the first effect: delaying the second takeoff time; and rescheduling the de-icing operation for the second aircraft based on a new takeoff time.

Clause 17: A system as is described in any of Clauses 15-16 and 18-20, wherein the first holdover window is further based on: an airframe type of the first aircraft; an operator specification for the airframe type; and a time span to remove accumulation from and apply an anti-ice solution to the first aircraft.

Clause 18: A system as is described in any of Clauses 15-17 and 19-20, wherein the operation further comprises, in response to the first travel time range exceeding a fuel use threshold, increasing a fuel load of the first aircraft.

Clause 19: A system as is described in any of Clauses 15-18 and 20, wherein the operation further comprises: identifying a second travel time range for a second aircraft from a second de-icing station to the runway; identifying a second holdover window for the second aircraft based on predicted weather conditions during the second travel time range; estimating a second takeoff time for the second aircraft based on the takeoff queue for the runway and the second travel time range; and in response to the second holdover window expiring after the estimated second takeoff time and within a caution threshold and determining that a push time for the second aircraft can be delayed without affecting the second takeoff time: delaying pushback for the second aircraft from a respective gate to thereby shift the second holdover window closer to the estimated second takeoff time.

Clause 20: A system as is described in any of Clauses 15-19, wherein the de-icing station is co-located with a gate for the first aircraft.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing. A computer readable storage medium, as used herein is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through wires.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
identifying a travel time range for an aircraft from a de-icing station to a runway based on a distance between the de-icing station and the runway, congestion patterns for travel between the de-icing station and the runway, and predicted weather conditions;
identifying a holdover window for the aircraft based on the predicted weather conditions during the travel time range;
estimating a takeoff time for the aircraft based on a takeoff queue for the runway and the travel time range;
in response to the holdover window expiring before the estimated takeoff time, delaying the aircraft from de-icing; and
in response to the travel time range exceeding a fuel use threshold, increasing a fuel load of the aircraft.

2. The method of claim 1, wherein delaying the aircraft from de-icing comprises one or more of:
rescheduling de-icing of the aircraft;
delaying pushback of the aircraft;
delaying pushback of the aircraft to reach the de-icing station and rescheduling de-icing of the aircraft; and
delaying takeoff of the aircraft and rescheduling de-icing of the aircraft.

3. The method of claim 1, wherein the holdover window is further based on:
an airframe type of the aircraft;
an operator specification for the airframe type; and
a time span to remove accumulation from and apply an anti-ice solution to the aircraft.

4. The method of claim 1, wherein the travel time range for the aircraft from the de-icing station to the runway is identified based on known taxiing speeds during specific weather conditions.

5. The method of claim 1, further comprising:
identifying a second travel time range for a second aircraft from a second de-icing station to the runway;
identifying a second holdover window for the second aircraft based on predicted weather conditions during the second travel time range;
estimating a second takeoff time for the second aircraft based on the takeoff queue for the runway and the second travel time range; and
in response to the second holdover window expiring after the estimated second takeoff time and within a caution threshold and determining that a push time can be delayed without affecting the second takeoff time:
delaying pushback for the second aircraft from a respective gate to thereby shift the second holdover window closer to the estimated second takeoff time.

6. The method of claim 1, further comprising:
identifying a second travel time range for a second aircraft from a second de-icing station to the runway;
identifying a second holdover window for the second aircraft based on predicted weather conditions during the second travel time range;
estimating a second takeoff time for the second aircraft based on the takeoff queue for the runway and the second travel time range; and
in response to the second holdover window expiring after the estimated second takeoff time and within a caution threshold and determining that a push time cannot be delayed without affecting the second takeoff time:
evaluating an effect of repeating a de-icing operation for the second aircraft on flight operations; and
in response to the effect of repeating the de-icing operation exceeding an impact threshold, delaying the second takeoff time.

7. The method of claim 1, further comprising:
identifying a second travel time range for a second aircraft from a second de-icing station to the runway;
identifying a second holdover window for the second aircraft based on predicted weather conditions during the second travel time range;
estimating a second takeoff time for the second aircraft based on the takeoff queue for the runway and the second travel time range; and
in response to the second holdover window expiring after the estimated second takeoff time and within a caution threshold and determining that a push time cannot be delayed without affecting the second takeoff time:
evaluating an effect of repeating a de-icing operation for the second aircraft on flight operations; and
in response to the effect of repeating the de-icing operation not exceeding an impact threshold, generating an alert to proceed to the de-icing operation as scheduled.

8. A method, comprising:
in response to identifying a first aircraft scheduled for de-icing within a first caution threshold of a first scheduled takeoff time and to determining that a first push time cannot be delayed without affecting the first scheduled takeoff time:
evaluating a first effect of repeating a de-icing operation for the first aircraft on flight operations; and
in response to the first effect of repeating the de-icing operation exceeding an impact threshold, wherein the impact threshold is based on cascade effects of the first aircraft departing later based on a new takeoff time, including missed flights for passengers associated with the aircraft, crew operation schedules associated with the aircraft, and weather conditions at a destination for the aircraft:
delaying the first scheduled takeoff time; and
rescheduling the de-icing operation for the first aircraft based on the new takeoff time.

9. The method of claim 8, further comprising:
in response to identifying a second aircraft scheduled for de-icing within a second caution threshold of a second scheduled takeoff time and to determining that a second push time can be delayed without affecting the second scheduled takeoff time:
delaying the second push time to a new push time; and
rescheduling a de-icing operation for the second aircraft based on the new push time.

10. The method of claim 8, further comprising:
in response to identifying a second aircraft scheduled for de-icing within a second caution threshold of a second scheduled takeoff time and to determining that a second push time cannot be delayed without affecting the second scheduled takeoff time:
evaluating a second effect of repeating the de-icing operation for the second aircraft on flight operations; and
in response to the second effect of repeating the de-icing operation not exceeding the impact threshold, generating an alert to proceed to the de-icing operation as scheduled for the second aircraft.

11. The method of claim 8, wherein evaluating the first effect of repeating the de-icing operation for the first aircraft on flight operations to exceed the impact threshold includes:
determining that the first aircraft can complete the de-icing operation a second time before the scheduled takeoff time;
determining that performing the de-icing operation the second time for the first aircraft will delay a second takeoff time for a second aircraft; and
determining that the first aircraft lacks a higher priority for departure over the second aircraft.

12. The method of claim 8, wherein evaluating the first effect of repeating the de-icing operation for the first aircraft on flight operations to exceed the impact threshold includes:
determining that the first aircraft cannot complete the de-icing operation a second time before the scheduled takeoff time.

13. The method of claim 8, wherein the impact threshold is based on:
a fuel consumption and an anti-ice solution consumption for repeating the de-icing operation; and
cascade effects of the first aircraft departing later based on the new takeoff time, including missed flights, crew operation schedules, and weather conditions at a destination.

14. A system, comprising:
a processor;
a memory storage device including instructions that when executed by the processor enable performance of an operation comprising:

identifying a first travel time range for a first aircraft from a de-icing station to a runway based on a distance between the de-icing station and the runway, congestion patterns for travel between the de-icing station and the runway, and predicted weather conditions;

identifying a first holdover window for the first aircraft based on the predicted weather conditions during the first travel time range;

estimating a first takeoff time for the first aircraft based on a takeoff queue for the runway and the first travel time range; and in response to the first holdover window expiring after the estimated first takeoff time and based on a confidence score in a prediction of the first aircraft being able to de-ice and depart on time compared to other aircraft attempting to depart, generating an alert for the first aircraft to proceed to a de-icing operation as scheduled.

15. The system of claim 14, wherein the operation further comprises:

in response to identifying a second aircraft competing with the first aircraft for use of the de-icing station, wherein the first aircraft is scheduled for de-icing within a first caution threshold of the first takeoff time, wherein the second aircraft is scheduled for de-icing within a second caution threshold of a second takeoff time for the second aircraft, and in response to determining that a second push time for the second aircraft cannot be delayed without affecting the second takeoff time:

evaluating a first effect of repeating the de-icing operation for the first aircraft on flight operations;

evaluating a second effect of repeating the de-icing operation for the second aircraft on the flight operations; and in response to the second effect of repeating the de-icing operation being greater than the first effect:
delaying the second takeoff time; and rescheduling the de-icing operation for the second aircraft based on a new takeoff time.

16. The system of claim 14, wherein the first holdover window is further based on:

an airframe type of the first aircraft;

an operator specification for the airframe type; and a time span to remove accumulation from and apply an anti-ice solution to the first aircraft.

17. The system of claim 14, wherein the operation further comprises, in response to the first travel time range exceeding a fuel use threshold, increasing a fuel load of the first aircraft.

18. The system of claim 14, wherein the operation further comprises:

identifying a second travel time range for a second aircraft from a second de-icing station to the runway;

identifying a second holdover window for the second aircraft based on predicted weather conditions during the second travel time range;

estimating a second takeoff time for the second aircraft based on the takeoff queue for the runway and the second travel time range; and in response to the second holdover window expiring after the estimated second takeoff time and within a caution threshold and determining that a push time for the second aircraft can be delayed without affecting the second takeoff time:

delaying pushback for the second aircraft from a respective gate to thereby shift the second holdover window closer to the estimated second takeoff time.

19. The system of claim 14, wherein the de-icing station is co-located with a gate for the first aircraft.

* * * * *